T. G. JACKLIN.
WHEEL SCRAPER DUMPER.
APPLICATION FILED JULY 29, 1909.
955,878.
Patented Apr. 26, 1910.
2 SHEETS—SHEET 1.
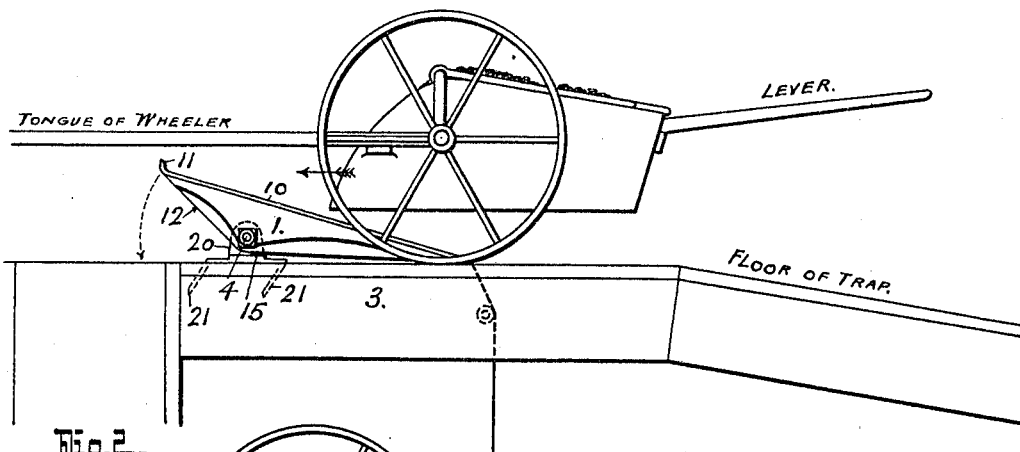
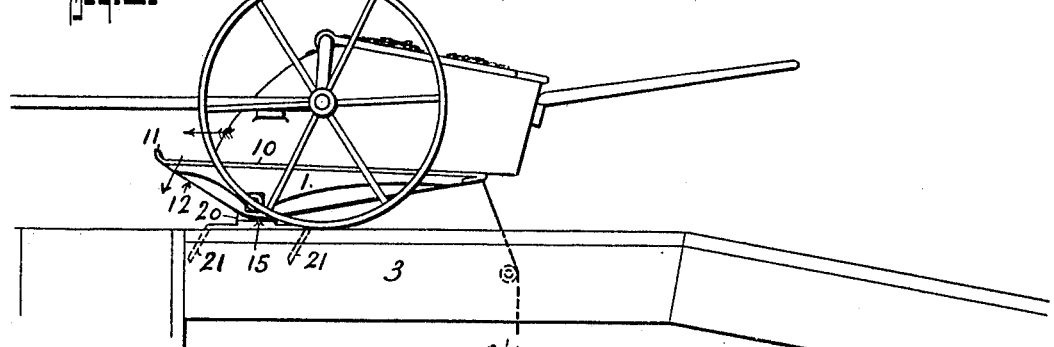
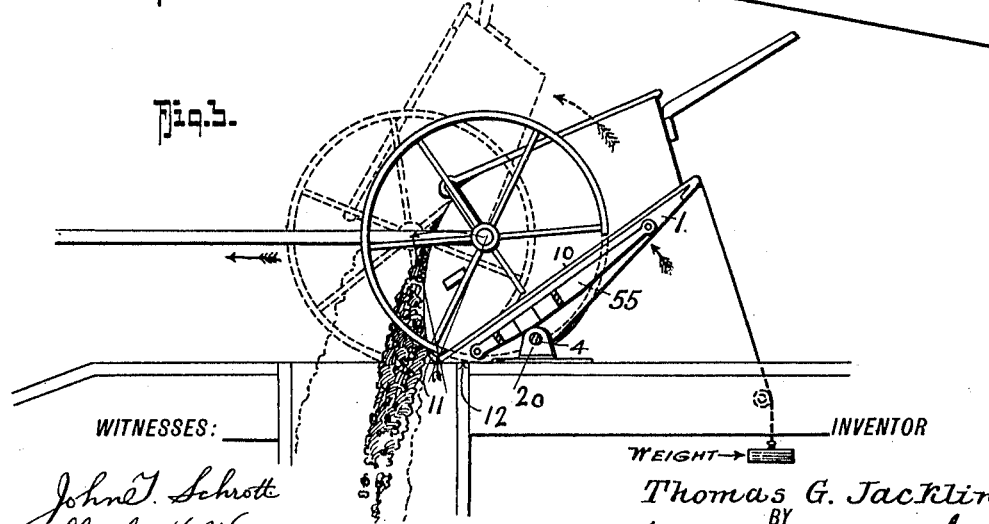
WITNESSES:
John T. Schrott
Charles H. Wagner
INVENTOR
Thomas G. Jacklin.
BY
Fred G. Dieterich & Co
ATTORNEYS

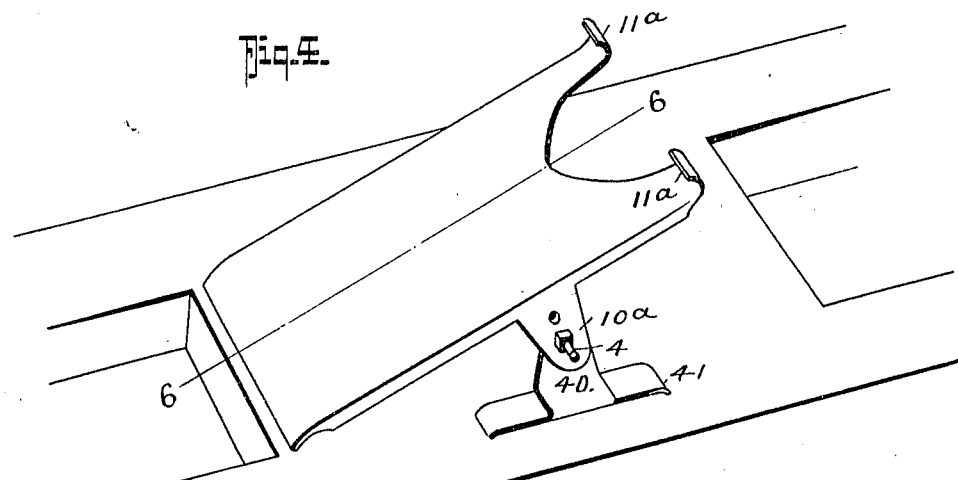
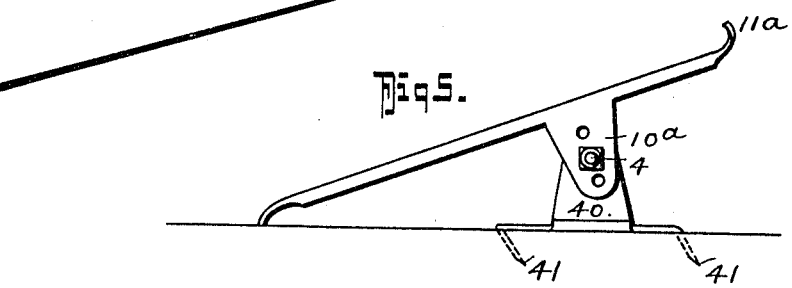
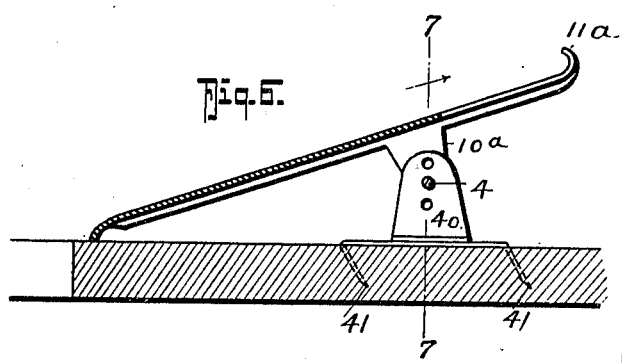
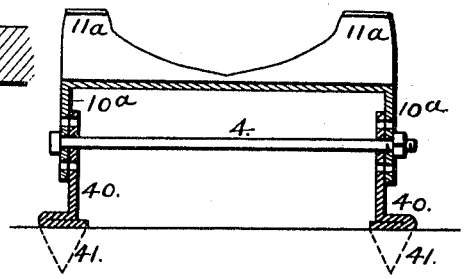
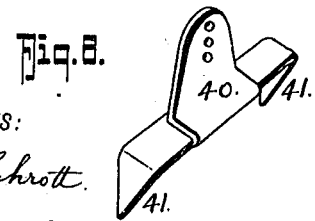

UNITED STATES PATENT OFFICE.

THOMAS G. JACKLIN, OF ZINC, ARKANSAS.

WHEEL-SCRAPER DUMPER.

955,878.  Specification of Letters Patent.  Patented Apr. 26, 1910.

Application filed July 29, 1909. Serial No. 510,238.

*To all whom it may concern:*

Be it known that I, THOMAS G. JACKLIN, residing at Zinc, in the county of Boone and State of Arkansas, have invented a new and Improved Wheel-Scraper Dumper, of which the following is a specification.

This invention relates to an improved means, more especially designed for use when loading gravel, or other material over what is commonly called a "trap" bridged across cars, and it has for its object to provide such a means that is economical in construction that can be readily applied for use at any place where it may be necessary to load cars with teams and wheeled scrapers, as also for filling in bridges and other places where the ordinary types of wheeled scrapers are adapted for use.

My invention, in its generic nature, comprehends an improved arrangement of inclined ways rockably mounted with respect to the base upon which it is secured and having trip claws relatively so positioned as to catch the front edge of the scraper as it passes in line with the trap to tilt it and to dump the load as the carrier moves across the trap, the said inclined ways automatically resuming their normal position after the scraper passes thereover.

In its more subordinate features, my invention consists in certain details of construction and novel arrangement of parts, all of which will be hereinafter fully explained, specifically pointed out in the claims and illustrated in the accompanying drawings, in which:

Figure 1, is a side elevation of one form of my device, and a wheeled scraper about to be dumped thereby, Figs. 2 and 3 are similar views illustrating the various steps in performing the dumping operation. Fig. 4, is a perspective view of a modified form of my invention. Fig. 5, is a side elevation thereof. Fig. 6, is a longitudinal section on the line 6—6 of Fig. 4. Fig. 7, is a cross section on the line 7—7 of Fig. 6. Fig. 8, is a detail view of one of the bracket bearings.

In its practical construction, my invention comprises a pair of skid like members 1—1 of suitable length, and the said members have flat upper faces or runways, preferably covered with wear strap irons 10, the outer ends of which terminate in upturned claws 11—11, the purpose of which will presently appear. In side view the members 1 are of an obtuse angle shape, the angle portion 12 being nearer the claw ends so that the outer or long ends are of sufficient excess weight to drop back onto the base on which the device is mounted after the said members are tilted forwardly in the manner clearly understood from Figs. 1 and 3, by reference to which it will be seen the members 1 are rockably mounted on a hinge rod 4 that has bearings in the upturned ends 20 of a bracket plate 2 which, in practice, is removably fastened on the floor through the medium of prongs 21—21 fitted into apertures suitably provided therefor, at a point just in advance of the opening through which the material is to be dumped.

The hinge rod and the side members 1 are so positioned and relatively joined that normally the front ends of the members 1—1 rest flatwise on the base 3 with their upper or runway faces on an incline and the angle portions 15 are rounded to also form fulcrum bearings for relieving undue strain on the bolt 4 which also acts as a brace for holding the side members that constitute the "tipple" to the desired position, said members being held rigid with respect to each other by the cross bars 55.

Directly over the hinge or pivot, the dumper is to be several inches higher than the plane in which the bottom of the wheeled scraper travels, for by so doing, as soon as the load strikes the dumper the whole weight thereof is taken charge of and equalized and is tripped through the trap into the cars.

From the foregoing, taken in connection with the drawings, the manner in which my invention operates and its advantages will be readily apparent. The wheeled scraper as it is drawn over the "bridge" having the trap, straddles the tipple and since the scoop slides up the skids of the tipple, its forward end engages the claws 11 and its momentum being arrested, causes the weight of the load to force down the claw ends as the scoop turns over or dumps the load through the trap.

While in some instances the front ends of the members can be made sufficiently long to provide for a prompt dropping back when the load and scraper are released when used for very heavy work the said front ends may each have a counterpoise 6 on the end of ropes 7 that pass from the members 1 over a guide pulley and through a hole in the base or platform.

In Figs. 4 to 8 inclusive is illustrated a slightly modified form of my invention and in this construction the "tipple" is a single member formed of boiler sheet metal with the lower front end curved downwardly, the upper end cut out and with its opposite edges turned up to form the tripping claws 11ª, its sides having turned down portions that form ears 10ª apertured to receive a pivot rod that engages one of a series of sets of apertures in the bracket bearings 40 which, in the present form, are of metal cast or otherwise formed with prong members 41 that extend at an angle from the base of the bracket so that the brackets can be firmly held by simply driving the prong members into the platform timbers as shown in Figs. 5 and 6

Having thus described my invention, what I claim and desire to secure by Letters Patent, is:—

1. A scraper dumper comprising a "tipple" formed of a single plate having an inwardly cut portion at one end and terminating at said end in upwardly curled claw portions, and means for rockably supporting said "tipple."

2. A scraper dumper comprising a pair of skids having upwardly inclined faces and each having a claw at the upper end, a supporting member adapted to be secured to a platform or base, and rocker bearings on the said member for the skids.

3. A scraper dumper comprising a plate having depending bearing ears at the sides, claw plates secured to the flooring and having upwardly projecting bearing ears, and means for pivotally connecting said depending bearing ears with said upturned ears.

4. A wheeled scraper dumper comprising the following elements in combination, supporting plates having projections for engaging the flooring, said plates having upturned ears, a "tipple" having one end curled to form claw members and having depending bearing portions at the sides and a pivot bolt projecting through said upturned ears for pivotally connecting said "tipple" to said supporting members and a counterbalancing means for the front end of said "tipple."

THOMAS G. JACKLIN.

Witnesses:
D. W. CAVE,
ALBERT THORNTON.